United States Patent [19]
Wood

[11] 3,901,142
[45] Aug. 26, 1975

[54] DOOR CONTROL MECHANISM FOR STACK-FORMING IMPLEMENT

[75] Inventor: William Robert Wood, Ankeny, Iowa

[73] Assignee: Deere & Company, Moline, Ill.

[22] Filed: June 20, 1973

[21] Appl. No.: 371,734

[52] U.S. Cl. ................. 100/255; 56/344; 100/100; 100/215; 100/218
[51] Int. Cl. .... B30b 5/00; B30b 15/32; A01d 43/06
[58] Field of Search ............. 100/100, 65, 188–189, 100/245–246, 255, 258, 215, 218; 130/20; 56/13.3, 341, 344, 346, 364, 347; 214/508, 522, 85; 296/51, 61

[56] References Cited
UNITED STATES PATENTS

| | | |
|---|---|---|
| 2,541,288 | 2/1951 | Rice ................................. 296/61 X |
| 3,552,109 | 1/1971 | Murray et al. .................... 56/344 X |
| 3,691,741 | 9/1972 | White et al. ..................... 100/100 X |
| 3,749,003 | 7/1973 | Wilkes et al. ................... 100/255 X |

*Primary Examiner*—Harvey C. Hornsby
*Assistant Examiner*—Arthur O. Henderson

[57] ABSTRACT

A mobile stack-forming implement of the type having a crop-receiving body, a crop pickup unit for picking crop material up off a field and depositing it in the crop-receiving body, a roof compressor mounted above the body and reciprocable vertically relative thereto to compress the crop material in the body from time to time, the implement including upper and lower rear doors on the roof and body, respectively, for permitting removal of a completed stack from the implement, and mechanism for simultaneously controlling both doors in response to vertical movement of the roof compressor relative to the body.

29 Claims, 12 Drawing Figures

3,901,142

DOOR CONTROL MECHANISM FOR STACK-FORMING IMPLEMENT

BACKGROUND OF THE INVENTION

The present invention relates generally to mobile agricultural stack-forming implements of the type having a crop-receiving body and a vertically reciprocable roof compressor, and more particularly to mechanism for simultaneously controlling both the upper and lower stack discharge opening doors on the roof and body, respectively, in response to vertical movement of the roof compressor relative to the body.

Mobile stack-forming implements of the type referred to are well known in the art and conventionally include a mobile frame having a crop-receiving body thereon, a crop pickup means mounted on the frame forwardly of the body for picking crop material up off a field and delivering it rearwardly into the body, and a roof compressor mounted on the body and reciprocable vertically relative thereto for compressing the material in the body from time to time during the stack-forming operation. Such implements further conventionally include a rear door apparatus that may be opened upon completion of the stack-forming operation to discharge the completed stack rearwardly from the body. Examples of the various types of rear door mechanisms heretofore known are disclosed in U.S. Pat. Nos. 3,556,327, issued Jan. 19, 1971 to Garrison, 3,691,741, issued Sept. 19, 1972 to White et al, and 3,732,672, issued May 15, 1973 to Adee et al.

SUMMARY OF THE INVENTION

It is a primary object of the present invention to provide an improved rear door mechanism for a mobile stack-forming implement of the type described, and more particularly to provide an improved control mechanism for the rear doors on such an implement which is operative to simultaneously control both upper and lower doors in response to vertical movement of the roof compressor relative to the crop-receiving body.

The invention comprises, generally, a mobile agricultural stack-forming implement having an upwardly opening crop-receiving body, a downwardly opening roof compressor mounted on the body for vertical reciprocal movement, both the body and the roof having a rear door movable between opened and closed positions, a control member connected to the roof door for controlling movement thereof between its opened and closed positions, and a catch mounted on the body and movable between first and second positions, the catch in the latter position only being operative to engage the control member as the roof is raised so that continued upward movement of the roof causes the roof door to move from its closed to its opened position. The body door is operative to control the position of the catch so that when the body door is closed the catch is in its first position and when the body door is moved from its closed toward its opened position the catch is moved from its first to its second position. The mechanism further comprises a releasable latch for retaining the body door in its closed position, and a latch release member engageable by the control member and movable thereby as the control member is raised with the roof, into engagement with the latch member to release the latch member and thereby permit the body door to move from its opened to its closed position.

The door opening process is initiated by the operator manually moving the latch release member into position wherein it is engaged by the control member as the latter is moved vertically with the roof, the control member being operative to move the latch release member into engagement with the latch and release the same to thereby permit the lower door to move from its closed position. As the lower door moves from its closed position, the catch is permitted to move to its second position so that upon continued upward movement of the roof, the control member is engaged by the catch which, in turn, causes the upper door to move from its closed to its opened position.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
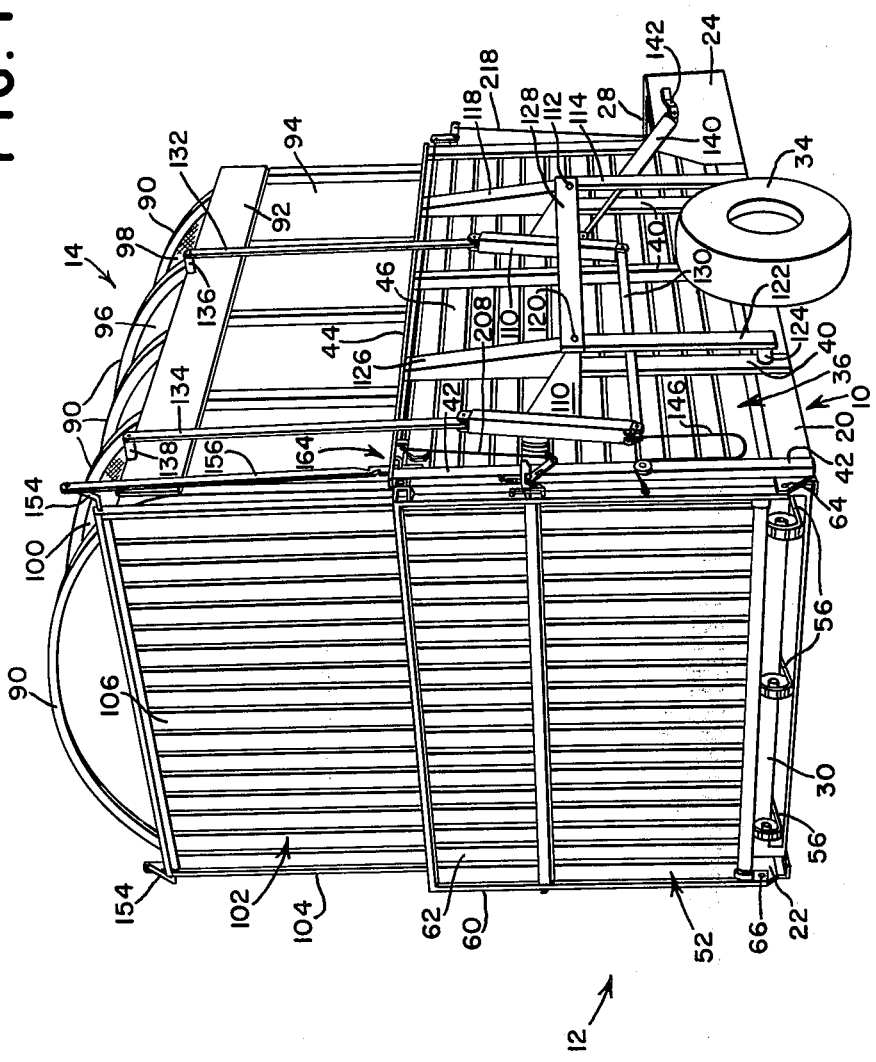
FIG. 1 is a perspective view of a stack-forming implement incorporating the mechanism of the present invention, as seen from the right rear of the implement.

Referring now to the drawings, the stack-forming implement of the invention comprises, generally, a mobile frame 10 adapted to be towed by a tractor, a crop-receiving container or body 12 carried by the frame, a top or roof 14 for the body 12 mounted on the latter for vertical reciprocable movement, the roof being operative to compress material in the container, a material pickup and delivery unit 16 mounted on the frame forwardly of the body 12 and operative to pick material such as windrowed hay up off the ground and propel the same upwardly, and a material delivery spout 18 for directing the material from the pickup unit rearwardly into the body 12. Although an elevational view of the left side of the machine is not shown in the drawings, the machine is generally symmetrical about its longitudinal axis and the ensuing description of those elements on the right side of the machine will thus be analogously applicable to the left side of the machine unless otherwise indicated.

The frame 10 includes a pair of longitudinally extending, transversely spaced beams 20 and 22 on the right and left sides, respectively, of the implement, a pair of right and left channel members 24 and 26 which are fixed to and extend forwardly from the forward ends of the beams 20 and 22, respectively, a transverse channel member 28 that connects the forward ends of the members 24 and 26, and a transverse beam 30 that connects the extreme rearward ends of the beams 20 and 22. A triangular hitch structure 32 is fixed centrally to the transverse channel 28 and extends forwardly therefrom, the structure being adapted at its forward end for attachment to the drawbar of a conventional agricultural tractor. A pair of ground-engaging wheels 34 are rotatably mounted on the midportions of the beams 20 and 22 to support the frame relative to the ground.

Figure 6:
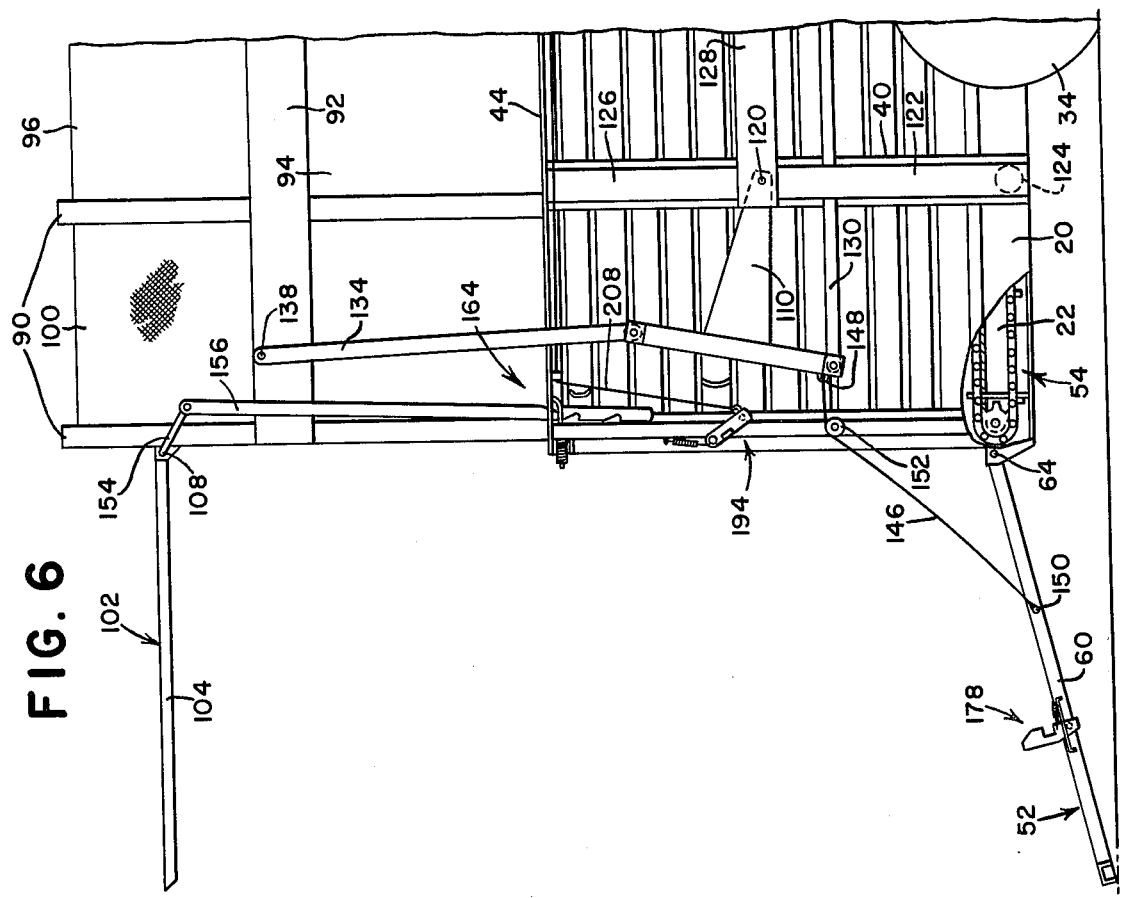
Figure 5:
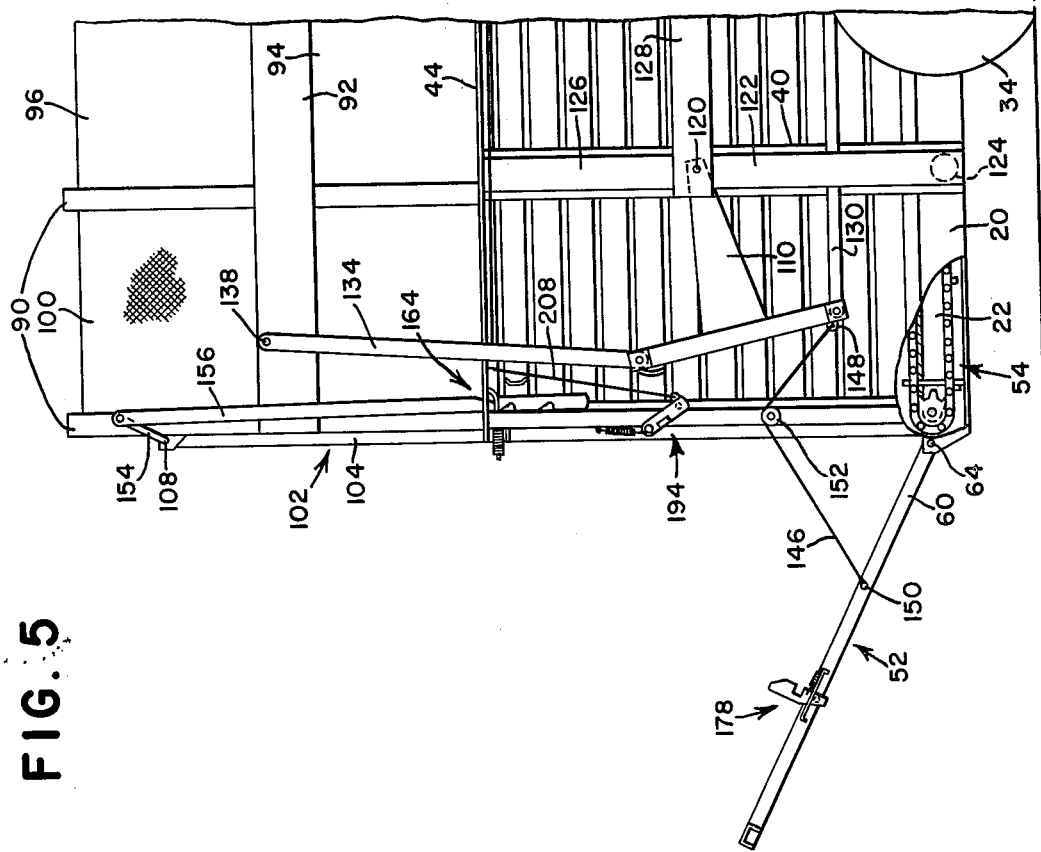

The body 12 is formed in part by a pair of vertically extending walls 36 and 38 on the right and left sides, respectively, of the implement. The right wall 36 of the body 12 includes a plurality of longitudinally spaced vertical bars 40 fixed at their lower ends to the longitudinal beam 20, a vertical channel member 42 fixed at its lower end to the extreme rear of the beam 20, a longitudinal plate member 44 which connects the upper ends of the bars 40 and channel 42, and a rectangular, corrugated sheet metal section 46 secured to the upper side of the beam 20 and the inner sides of the bars 40, channel 42 and plate 44. The body 12 further includes a horizontal floor 48 which extends transversely between the longitudinal beams 20 and 22, a front wall 50 which encloses the forward ends of the sides 36 and 38 and floor 48, and a rear door 52 which normally encloses the lower half of the stack discharge opening at the rear of the body. A floor conveyor designated generally by the numeral 54 is movable rearwardly along the top surface of the floor 48 to remove a completed stack from the body 12. The conveyor 54 is of conventional design and includes three longitudinally extending chains 54 interconnected by a plurality of transverse slats 58. The rear door 52 comprises a frame structure 60 which has a rectangular section of corrugated sheet metal 62 affixed thereto. The frame 60 is pivotally mounted at 64 and 66 to the extreme rearward ends of the beams 20 and 22, respectively, for vertical swinging movement between a raised or closed position shown in FIGS. 1–3 of the drawings and a lowered or opened position shown in FIG. 6, the door in the latter position serving as a ramp for unloading a completed stack from the container.

The crop pickup unit 16 is suspended on the frame for limited vertical movement through the rectangular opening defined by the longitudinal channel members 24 and 26, the transverse channel 28, and the front wall 50 of the body. The unit includes a housing 68 which is formed integrally with and at the lower end of the spout 18, a transverse shaft 70 supported at opposite ends in the side-walls of the housing 68, and a plurality of crop pickup and propelling paddles 72 pivotally supported on the shaft 70. The upper end of the pickup unit and spout combination is supported on the body 12 by a pair of fore-and-aft extending arms 74 which are pivoted at their forward ends to the sides of the spout 18 and at their rear ends to brackets 76 fixed to the front wall 50. The lower end of the unit is supported on the frame for vertical adjustment in a manner not material to the present invention and therefore not fully disclosed. The lower support may take the form of the apparatus disclosed for this purpose in copending U.S. application, Ser. No. 344,712 now U.S. Pat. No. 3,813,861. A major portion of the weight of the pickup unit and spout is suppoorted from the front wall of the body by a pair of springs 78 which connect the unit 16 with brackets 80 on opposite sides of the wall. The suspension mechanism for the pickup unit permits the unit to "float" vertically relative to the frame to conform to variations in the surface of the ground.

The spout 18 has a generally vertical lower portion 82 communicating at its lower end with the pickup unit housing 68, and an arcuate upper portion 84 terminating in a rearwardly directed discharge openging 86. In operation, the pickup unit shaft 70 is driven in a couterclockwise direction as viewed in FIG. 2, causing the paddles 72 to extend radially outwardly from the center of the shaft and define the cylinder shown in dotted lines in the drawings. The shaft is driven from the power take-off on the tractor used for towing the implement, through conventional drive means enclosed by a sheet metal shield 88. As the paddles rotate in the manner described, they engage crop material lying on the ground, such as windrowed alfalfa or the like, and propel it upwardly through the spout 18. The curved leading wall of the spout portion 84 directs the material rearwardly through the discharge opening 86 and into the body 12.

The roof 14 has a downwardly opening, inverted U-shaped configuration and comprises five equally spaced U-shaped support members 90 which have vertical leg portions extending upwardly in parallel relation to and inwardly of the walls 36 and 38 of the body 12. The members 90 are rigidly connected by means of a longitudinal brace 92 which extends between the upper ends of the vertical leg portions of the members. A rectangular sheet metal panel 94 is secured to the inner sides of the vertical legs of the members 90 below the brace 92, a curved sheet metal panel 96 extends between the curved portions of the second and fourth members 90 and is secured to the inner sides thereof, and curved sections of heavy gauge screen 98 and 100 extend between the first and second and fourth and fifth members 90, respectively, and are similarly secured to the inner sides thereof. The screen sections 98 and 100 allow excess air blown into the body by the unit 16 to escape.

The top 14 further includes a rear door 102 which normally encloses the upper half of the stack discharge opening at the rear of the body. The door 102 comprises a frame structure 104 which has a rectangular sheet metal section 106 affixed thereto. The frame 104 is pivoted along its upper edge at 108 and is swingable between a lowered or closed position shown in FIGS. 1–5 of the drawings and a generally horizontal or opened position shown in FIG. 6, the door in the latter position being operative to permit removal of the completed stack from the body 12.

Mechanism connecting the roof to the body and operative to move the roof relative to the body between its raised and lowered positions is provided on each side of the implement. During the stack-forming process the roof is normally maintained in its raised position, but from time to time it is lowered to engage and compress the crop material that has accumulated in the body and thereby produce a more dense stack. As is apparent from the drawings, the sidewalls of the roof are disposed just inwardly of the sidewalls of the body and the door on the roof is disposed just inwardly of the door on the container, so that the roof is free to move vertically relative to the body between its raised and lowered positions. The mechanism on the left side of the implement is a mirror image of that on the right side, and the ensuing description of the latter is thus analogously applicable to the former. The mechanism includes a pair of fore-and-aft, identical T-shaped crank member 110 pivotally mounted on the sidewall 36 for vertical swinging movement about horizontally coplanar, longitudinally spaced transverse axes. The front transverse axis is defined by a pin 112 which extends transversely between one of the vertical bars 40 and a vertical member 114 which is disposed outwardly from and in spaced relation to the bar. The lower end of the member 114 is connected to the outer end of a cylindrical spacer 116 which is, in turn, connected to the outer side of the frame member 20, and the upper end of the member is connected to a tapered brace 118 which is fixed to the upper portion of the bar 40. Similarly, the rear transverse axis is defined by a pin 120 which extends transversely between another of the vertical bars 40 and a vertical member 122 which is disposed outwardly from and in spaced relation to the bar. The lower end of the member 122 is connected to the outer end of a second cylindrical spacer 124 similar to the spacer 116 and the upper end is connected to a second tapered brace 126 fixed to the upper portion of the bar 40. A support 128 extends longitudinally between the upper ends of the vertical members 114 and 122, in spaced relation to the wall 36. A horizontal link 130 interconnects the lower ends of each of the cranks 110 and acts to maintain the cranks in parallel relation at all times, and a pair of fore-and-aft vertical links 132 and 134, respectively, connect the upper ends of the cranks with fore-and-aft pins 136 and 138, respectively, on the longitudinal brace member 92. Completing the mechanism is a hydraulic cylinder 140 which extends longitudinally between the vertical member 114 and its adjacent vertical bar 40, and connects a bracket 142 fixed to the side of the channel member 24 and a bracket 144 on the front crank member 110. The cylinder is connectable through means not shown with the hydraulic system on the tractor used to tow the implement and is extensible and retractable to pivot the front crank 110 about the pin 112. Movement of the front crank is transferred to the rear crank by the horizontal link 130, and pivotal movement of each of the cranks is translated to vertical movement of the roof by means of the vertical links 132 and 134.

Figure 2:
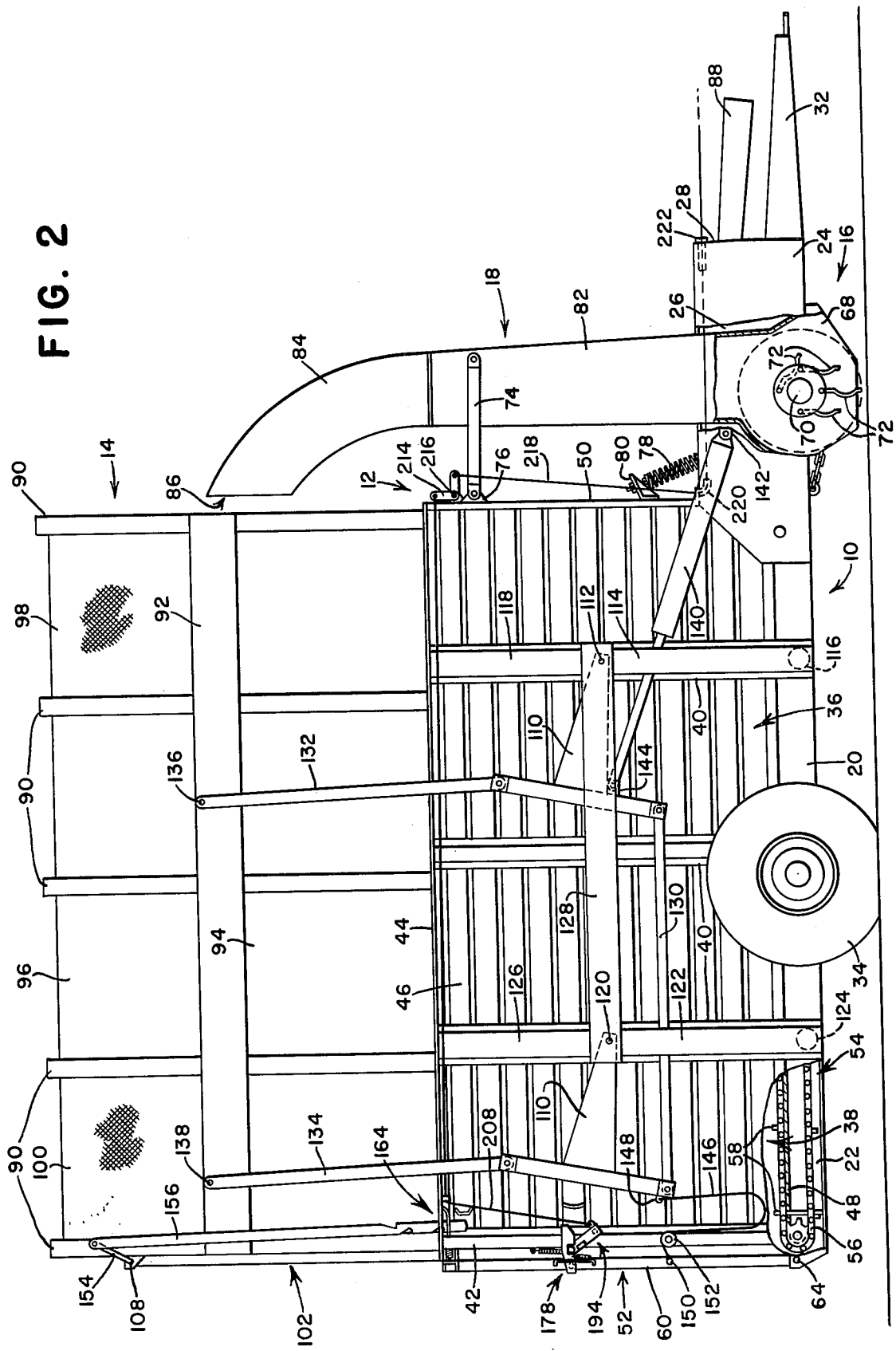
FIG. 2 is a right side elevational view of the implement shown in FIG. 1, with portions broken away for the sake of clarity.
Figure 3:
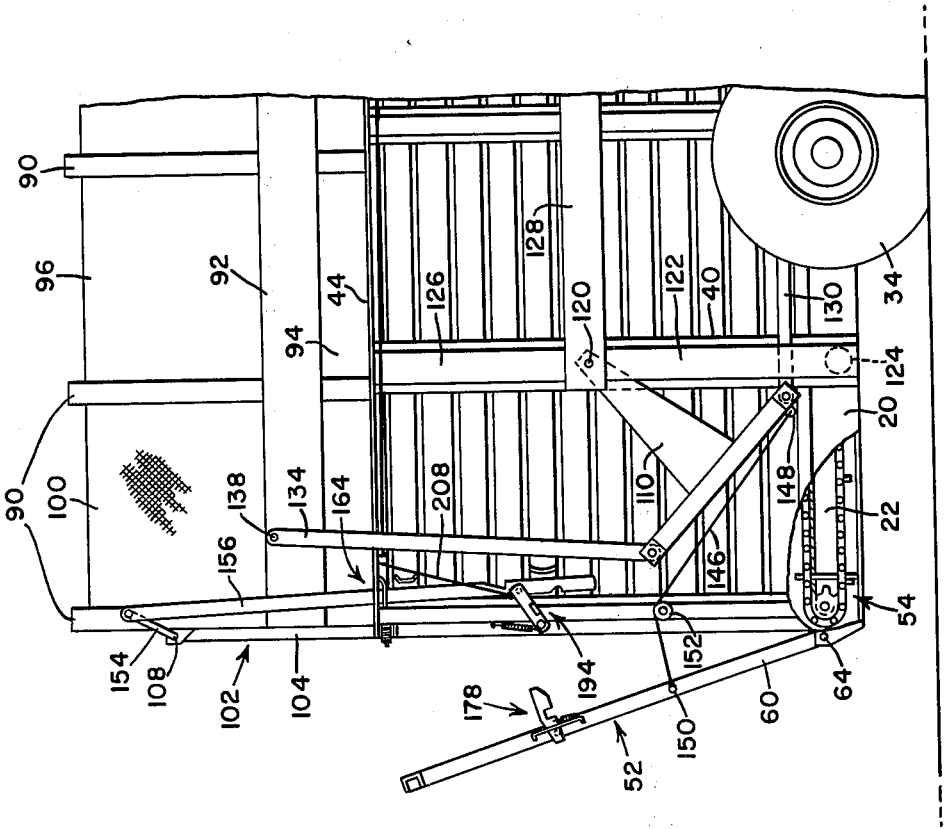
FIGS. 3–6 are right side elevational views of the rear portion of the implement, showing the sequence of operation of the door control mechanism.
Figure 4:
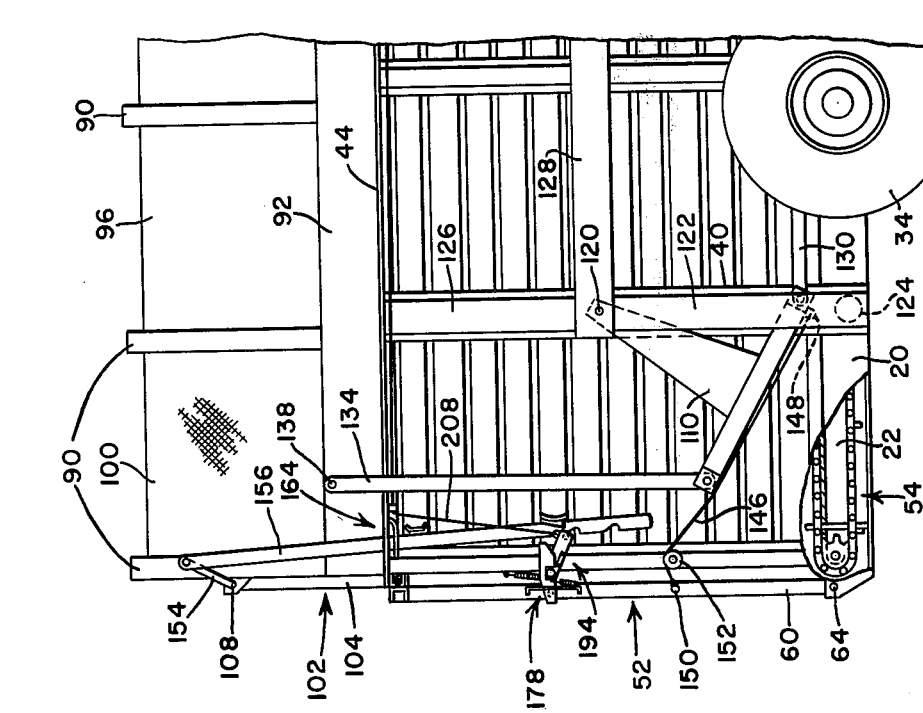

The rear T-shaped crank 110 also serves to positively move the body door 52 between its raised and lowered positions, by means of a flexible cable 146 which connects a bracket 148 on the lower forward end of the crank with an anchor 150 on the side of the door 52. The cable 52 is supported by a sheave 152 which is rotatably mounted on the side of the channel 42. When the door is released from its closed position, in the manner which will be subsequently described, it will descend by the force of gravity to its lowered position. The rate of descent of the door will be positively controlled through the cable connection by the rear crank as the latter pivots in a clockwise direction about the pivot 120 to raise the roof 14. The various elements are constructed and arranged so that the door will be in its opened position when the roof is fully raised (see FIG. 6). Conversely, as the rear crank 110 swings in a counterclockwise direction about the pivot 120 to lower the roof from its fully raised position, the cable connection with the door will raise the latter toward its closed position. The elements are arranged so that the door will be in its closed position when the roof is fully lowered (see FIG. 3). When the roof is raised with the door 52 secured in its closed position, the cable 146 will merely slacken as illustrated in FIG. 2 of the drawings.

The rear door control mechanism of the invention is operative to control both the opening and closing of the doors 52 and 102 in response to movement of the roof 14 between its raised and lowered positions. With the exception that will be noted, the control mechanism on the left side of the machine is identical to that shown on the right side. The mechanism includes an arm 154 that is fixed to each of the upper corners of the roof door 102 and extends upwardly and forwardly therefrom when the door is in its closed position (see FIGS. 1–5 of the drawings). Pivotally connected to the upper end of each arm 154 is a control member 156 that hangs downwardly therefrom alongside the roof 14 and body 12 and extends through an aperture 158 in the plate member 44. A pair of vertically spaced notches 160 are formed on the rear edge of the lower end of the member, and a single notch 162 is formed on the front edge of the member just above the uppermost notch 160. The function of the notches 160 and 162 in the operation of the control mechanism will subsesquently be explained.

Figure 11:
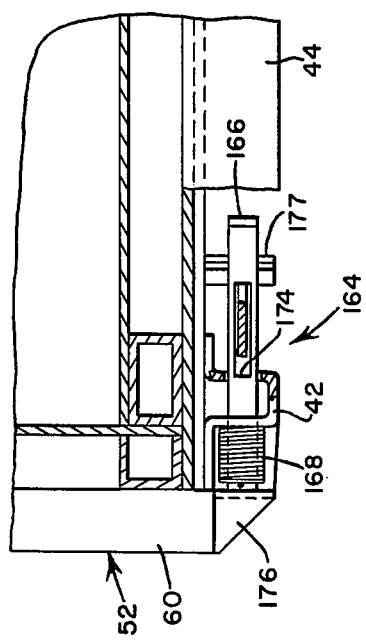
FIG. 11 is a sectional view taken along the line 11—11 of FIG. 10.
Figure 10:
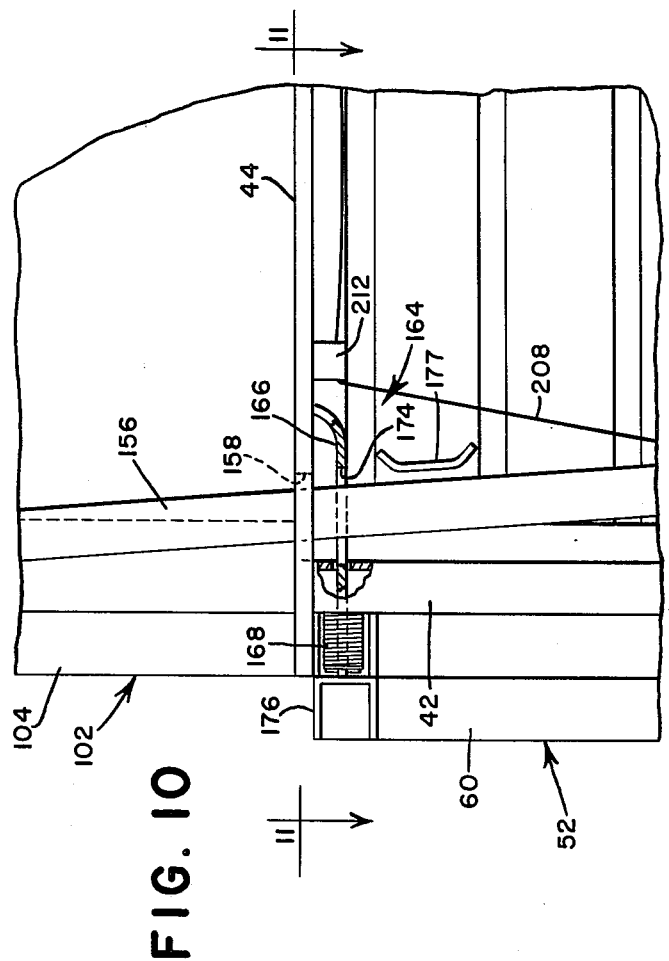
FIG. 10 is an enlarged right side elevational view of the upper rear door control mechanism.

Mounted on each upper rear corner of the body 12, beneath the plate 44, is a spring biased catch designated generally by the numeral 164. The catch 164 comprises a generally horizontal bar 166 that is received for longitudinal sliding movement by a pair of apertures formed in the front and rear walls of the channel 42 and has an upturned forward end that engages the underside of the plate 44, and a coil spring 168 that is received on that portion of the bar 166 that extends rearwardly from the channel 42 and acts between the rear wall of the channel and a washer 170 retained on the rear of the bar by a pin 172, to bias the bar 166 rearwardly. The forward portion of the bar is provided with a slotted aperture 174 which slidably receives the control member 156 as the roof 14 moves between its raised and lowered positions. When the lower or body door 52 is in its closed position, the front side of a triangular bracket 176 fixed to the door engages the rear end of the bar 166 and holds it forwardly against the rearward biasing force of the spring 168. Referring now to FIGS. 10 and 11 of the drawings, it will be noted that when the door 52 is closed, the bar 166 is held in a position wherein the rear edge of the aperture 174 is disposed rearwardly of the front wall of the channel 42 and the front edge of the aperture is disposed forwardly of a guide plate 177 secured to the side of the body. The guide plate 177 limits forword movement of the control member 156 and the front wall of the channel 42 limits rearward movement thereof, and it will thus be apparent that when the catch is in the position shown in FIG. 10 the control member 156 will pass through the aperture 168 in the bar 166 without either of the notches 160 and 162 therein contacting the edges of the aperture. When the door 52 is opened, however, the bar 166 is free to move rearwardly through the apertures in the walls of the channel 42, until the front edge of the aperture 174 in the bar is biased against the front edge of the control member 156 and the rear edge of the latter is biased against the front wall of the channel. As the control member 156 is raised with the roof, the front edge of the aperture 174 in the bar 166 will eventually engage the notch 162 in the front edge of the control member 156 (see FIG.

12), and further upward movement of the member 156 will be prevented. Continued vertical movement of the roof will thus cause the upper door 102 to swing upwardly about the pivot 108 to the generally horizontal open position shown in FIG. 6.

Figure 9:
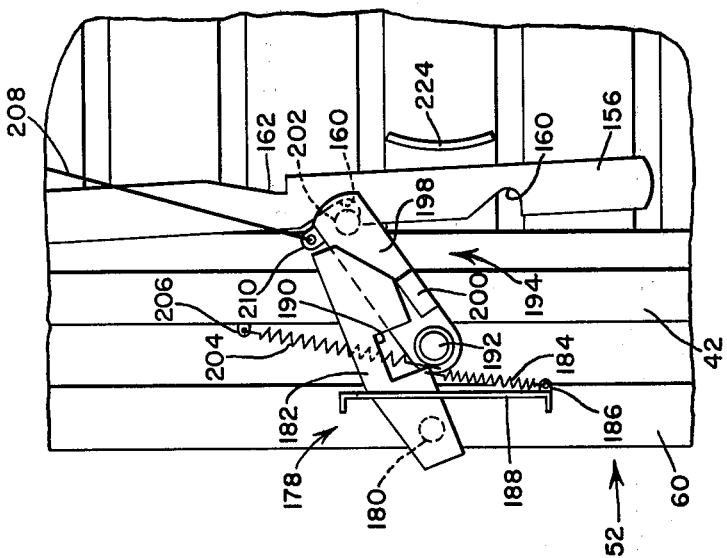
FIG. 9 is a view similar to FIG. 7 but showing the mechanism in its operating condition.
Figure 8:
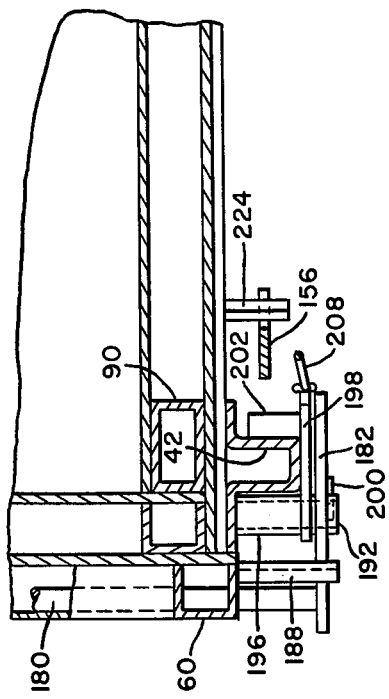
FIG. 8 is a sectional view taken along the line 8—8 of FIG. 7.
Figure 7:
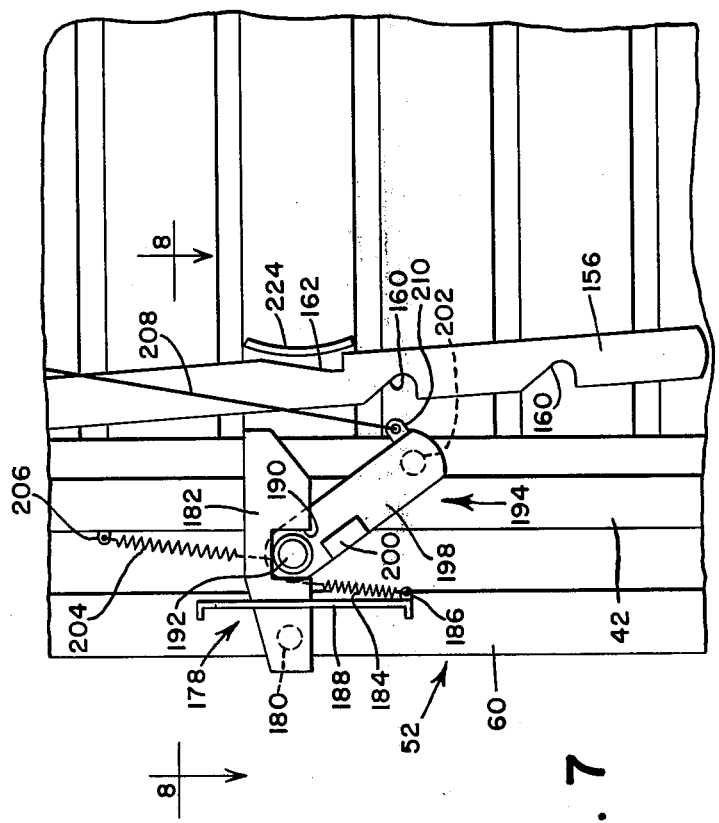
FIG. 7 is an enlarged right side elevational view of the lower rear door control mechanism.
Figure 12:
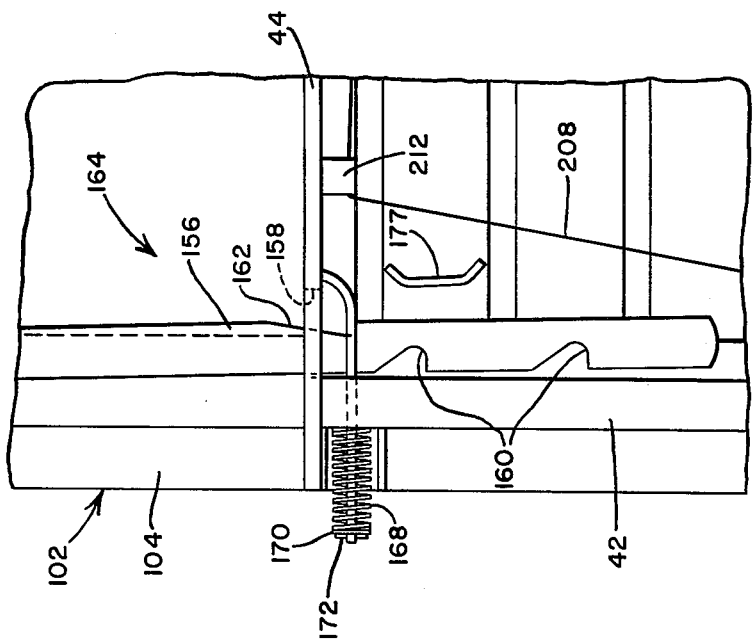
FIG. 12 is a view similar to FIG. 10 but showing the mechanism in its operating condition.

Referring now to FIGS. 7–9 of the drawings, a spring biased latch mechanism 178 is provided on the lower or body door 52 to normally retain the door in its closed position. The latch mechanism comprises a rod 180 that extends transversely between and is rotatably supported in the side members of the door frame 60, a latch plate 182 fixed to each end of the rod 180, and a coil spring 184 that extends between the latch plate 182 and an anchor 186 disposed therebeneath, to bias the latch plate and rod assembly in a clockwise direction as viewed in FIG. 7. The latch plate 182 extends forwardly through and is guided by a vertical slot formed in a plate 188 that is fixed to the side of the door frame 60. The anchor 186 for the lower end of the spring 184 is fixed to the lower end of the plate 188. The latch plate 182 is provided with a rectangular notch 190 that receives the outer end of a cylindrical pin 192 fixed to the body channel member 42, to retain the door 52 in its closed position.

Mechanism for releasing the latch 178 and thereby permitting the door 52 to move to its open position is provided on the right side of the implement only in the form of a latch release member designated generally by the numeral 194. The member 194 comprises a hollow cylindrical section 196 journaled on the inner portion of the pin 192, an arm 198 fixed to the section 196 and extending forwardly therefrom inwardly of the latch plate 182, a block 200 fixed to the arm 198 forwardly of the section 196, and a transverse pin 202 fixed to the forward end of the arm 198 and extending inwardly toward the side of the body. A coil spring 204 connects the rearward end of the arm 198 with an anchor 206 on the rear wall of the channel 42 to bias the arm in a clockwise direction as viewed in FIG. 7. A flexible cable 208 is secured at one end to a bracket 210 on the forward end of the arm 198, and extends upwardly to a 90°guide 212 on the side of the body, thence forwardly to the upper end of one arm of a bell crang 214. The bell crank 214 is supported on the right front of the implement body for pivotal movement about a transverse axis at 216. A second cable 218 is secured to the forward end of the other arm of the bell crank and extends downwardly therefrom to a 90°guide 220 in the top wall of the channel member 24, thence forwardly beneath the wall and through a guide 222 in the forward wall of the transverse channel 28. The forward end of the cable 218 is supported in the vicinity of the operator's platform on the tractor so that it is accessible to the operator. It will be appreciated that when the forward end of the cable 218 is pulled by the operator, the bell crank 214 is caused to pivot in a clockwise direction as viewed in FIG. 2, which, through the cable 208 causes the latch release member 194 to pivot upwardly in a counterclockwise direction as viewed in the same drawing.

As the roof 14 is moved between its raised and lowered positions during the stack-forming process, the latch release member 194 is held by means of the spring 204 in the position shown in FIG. 7, the catch 164 is held by means of the closed door 52 in the position shown in FIG. 10, and the control member 156 thus moves vertically with the roof without obstruction.

To initiate the door opening sequence, the operator lowers the roof 14 to compress the stack a final time. He then pulls on the forward end of the cable 218 which causes the latch release member 194 to pivot upwardly and forwardly about the pin 192 until the pin 202 engages and is biased against the rear edge of the control member 156, following which he initiates movement of the roof toward its raised position (see FIG. 3). As the control member 156 moves vertically with the roof, the pin 202 on the member 194 will engage one of the notches 160 formed in the rear edge of the member. Depending on the height of the completed stack, which may vary somewhat, either both or only the lowermost of the notches 160 will be disposed below the pin 202 when the roof is lowered during its final compression cycle. In either event, the pin 202 will engage one of the notches 160 whereupon continued movement of the control member 156 will pivot the latch release member 194 in a counterclockwise direction until the block 200 on the arm 198 engages the underside of the latch plate 182 and pivots the same upwardly about the axis of the rod 180 and against the force of the spring 184, until the notch 140 in the plate 182 is raised out of engagement with the pin 192. To prevent the control member 156 from moving forwardly out of engagement with the pin 202, an arcuate guide plate 224 is mounted on the side of the body wall to engage the member 156 and limit its forward movement. At this point, the door 52 is free to fall through a small angle to remove the slack in the cable 208 which results from the initial upward movement of the roof (see FIG. 4). As previously explained, once the initial slack is removed from the cable, the rate of descent of the door is positively controlled by the rear crank 110.

The desirability of minimizing the distance through which the door 52 may fall freely following release of the latch 178 will be appreciated. Since the height of the completed stacks will vary, the position of the control member 156 in relation to the latch release member 194 will also vary. For this reason, a plurality of vertically spaced notches 160 have been provided in the control member 156 to minimize the distance through which the control member must move, and thus minimize the slack in the cable 208, prior to release of the latch 178. The lowermost notch 160 is located to give the maximum desirable slack in the cable 208.

As the lower door 52 is initially opened, it releases the catch 164 so that the spring 168 is free to bias the front edge of the aperture 174 in the bar 166 against the forward edge of the control member 156. Continued upward movement of the control member with the roof causes the notch 162 in the forward edge of the member 156 to come into engagement with the front edge of the aperture 174, to thereby prevent further upward movement of the control member (see FIG. 5). Continued upward movement of the roof relative to the control member thus exerts a downward force on the upper ends of the arms 154 which, in turn, causes the upper door 102 to swing upwardly to its generally horizontal, open position shown in FIG. 6.

Following removal of the completed stack from the body 12, the doors 52 and 102 are returned to their closed positions in preparation for forming another stack by merely lowering the roof 14. Initial downward movement of the roof relieves the downward force on the upper ends of the arms 154 and permits the upper door to descend to its closed position, and counter-clockwise movement of the rear crank 110 exerts a forward pull on the cable 146 which returns the lower door to its closed and latched position.

I claim:

1. A stack-forming implement comprising: an upwardly opening crop-receiving body having an open end through which a completed stack can pass; a door mounted on the body and movable into and out of closing relationship with the open end thereof; a downwardly opening roof for the body mounted thereon for vertical reciprocable movement to compress crop material in the body from time to time and having an open end through which a completed stack can pass; a door mounted on the roof and movable into and out of closing relationship with the open end thereof; a control member connected to the roof door for controlling movement thereof between its opened and closed positions, said control member normally being movable vertically with the roof; a catch mounted on the body and movable between first and second positions, said catch in the latter position only being operative to engage the control member as the roof is raised so that continued upward movement of the roof causes the roof door to move from its closed to its opened position; said body door being operative to control the position of the catch so that when the body door is closed the catch is in its first position and when the body door is moved from its closed toward its opened position the catch is moved from its first to its second position.

2. The invention defined in claim 1 including a releasable latch member for retaining the body door in its closed position, and a latch release member engageable by the control member and movable thereby, as the control member is raised with the roof, into engagement with the latch member to release the latch member and thereby permit the body door to move from its closed to its opened position.

3. The invention defined in claim 2 wherein the latch release member is movable between first and second positions, the latch release member being engageable by the control member only when in the latter position.

4. The invention defined in claim 3 including means biasing the latch release member toward its first position.

5. The invention defined in claim 4 including means for manually moving the latch release member to its second position against the force of said biasing means.

6. The invention defined in claim 3 wherein the control member is provided with a notch which engages the latch release member as the control member is raised with the roof, when the latch release member is moved to its second position.

7. The invention defined in claim 6 wherein the control member is provided with a plurality of vertically spaced notches engageable by the latch release member as the control member is raised with the roof, when the latch release member is moved to its second position.

8. The invention defined in claim 2 including means connecting the roof to the body door for controlling movement of the latter between its opened and closed positions in response to vertical movement of the former relative to the body, and wherein the latch release member is engageable by the control member only during the initial portion of the upward movement of the roof from its lowermost position relative to the body.

9. The invention defined in claim 2 wherein the body door is mounted on the rear of the body for movement between a generally vertical closed position and a downwardly and rearwardly inclined opened position wherein the door is operative as a ramp for facilitating removal of a completed stack from the body, the door being movable from its closed to its opened position by the influence of gravity upon release of the latch member; including means connecting the roof and the body door to control movement of the door under the influence of gravity so that the door will open at a speed in direct relation to the speed at which the roof is raised relative to the body; and wherein the latch release member is engageable by the control member only during the initial portion of the upward movement of the roof from its lowermost position relative to the body.

10. The invention defined in claim 2 wherein the releasable latch member is mounted on the body door and is movable therewith.

11. The invention defined in claim 1 wherein the body door is operative to retain the roof door in its closed position when the body door is in its closed position.

12. The invention defined in claim 1 including means biasing the catch toward its second position, the body door being engageable with the catch when in its closed position and operative to maintain the catch in its first position against the force of said biasing means.

13. The invention defined in claim 12 wherein said biasing means is operative, when the catch is maintained in its first position by the door, to bias the door toward its open position.

14. The invention defined in claim 1 wherein the control member is provided with a notch engageable by the catch when the latter is in its second position.

15. The invention defined in claim 14 wherein the control member is provided with a plurality of vertically spaced notches engageable by the catch when the latter is in its second position.

16. A stack-forming implement comprising: a crop-receiving body; a roof for the body mounted thereon for vertical reciprocable movement to compress crop material in the body from time to time and having an open end through which a completed stack can pass, a door mounted on the roof and movable into and out of closing relationship with the open end thereof; a control member connected to the roof door for controlling movement thereof between its opened and closed positions, said control member normally being movable vertically with the roof; and a part of said member extending past said body and a catch mounted on the body mounted adjacent said control member and selectively movable between first and second positions, said catch in the latter position only being operative to engage the control member as the roof is raised so that continued upward movement of the roof causes the roof door to move from its closed to its opened position.

17. The invention defined in claim 16 including means for effecting movement of said catch from its first to its second position in response to vertical upward movement of the roof.

18. A stack-forming implement comprising: a crop-receiving body having an open end through which a completed stack can pass; a roof for the body mounted thereon for vertical reciprocable movement to compress crop material in the body from time to time; a control member connected to the roof and movable therewith relative to the body; a body door mounted on the body for movement between a generally vertical closed position and a downwardly and rearwardly inclined opened position wherein the door is operative as a ramp for facilitating removal of a completed stack from the body; a releasable latch member for retaining the body door in its closed position; and a latch release member engageable by the control member and movable thereby as the control member is moved with the roof during the initial portion of the upward movement of the roof from its lowermost position relative to the body, such that as the control member is moved with the roof and engaged with the latch release member, the latch member is released and the body door is permitted to move from its closed to its opened position by the influence of gravity; and including means connecting the roof and the body door to control movement of the door under the influence of gravity so that the door will open at a speed in direct relation to the speed at which the roof is raised relative to the body.

19. A stack-forming implement comprising: a crop-receiving body; a roof for the body mounted thereon for vertical reciprocable movement to compress crop material in the body from time to time, and having an open end through which a completed stack can pass; a door movable into and out of closing relationship with the open end of the roof; a control member connected to the roof for controlling movement of the door between its opened and closed positions, said control member normally being movable vertically with the roof; and a catch mounted on the body and selectively movable between first and second positions, said catch in the latter position only being operative to engage the control member as the roof is raised so that continued upward movement of the roof causes the door to move from its closed to its opened position.

20. The invention defined in claim 19 including means for effecting movement of said catch from its first to its second position in response to vertical upward movement of the roof.

21. The invention defined in claim 19 in which the door is mounted on the body.

22. The invention defined in claim 21 including a releasable latch member for retaining the door in its closed position; and a latch release member engageable by the control member and movable thereby as the control member is moved with the roof into engagement with the latch release member to release the latch member and thereby permit the door to move from its closed to its opened position.

23. The invention defined in claim 22 wherein the latch release member is movable between first and second positions, the latch release member being engageable by the control member only when in the latter position.

24. The invention defined in claim 23 wherein the control member is provided with a notch which engages the latch release member as the control member is raised with the roof, when the latch release member is moved to its second position.

25. The invention defined in claim 23 including means biasing the latch release member toward its first position.

26. The invention defined in claim 25 including means for manually moving the latch release member to its second position against the force of said biasing means.

27. The invention defined in claim 22 including means connecting the roof to the body door for controlling movement of the latter between its opened and closed positions in response to vertical movement of the former relative to the body, and wherein the latch release member is engageable by the control member only during the initial portion of the upward movement of the roof from its lowermost position relative to the body.

28. The invention defined in claim 22 wherein the body door is mounted on the rear of the body for movement between a generally vertical closed position and a downwardly and rearwardly inclined opened position wherein the door is operative as a ramp for facilitating removal of a completed stack from the body, the door being movable from its closed to its opened position by the influence of gravity upon release of the latch member; including means connecting the roof and the body door to control movement of the door under the influence of gravity so that the door will open at a speed in direct relation to the speed at which the roof is raised relative to the body; and wherein the latch release member is engageable by the control member only during the initial portion of the upward movement of the roof from its lowermost position relative to the body.

29. The invention defined in claim 22 wherein the releasable latch member is mounted on the body door and is movable therewith.

* * * * *